United States Patent
Shaiovitch

(10) Patent No.: US 10,592,614 B1
(45) Date of Patent: Mar. 17, 2020

(54) SYSTEM, METHOD, AND COMPUTER PROGRAM FOR TRANSLATING UNIFIED TICKETING SYSTEM (UTS) MESSAGES

(71) Applicant: Amdocs Development Limited, Limassol (CY)

(72) Inventor: Tzahi Menachem Shaiovitch, Kfar-Saba (IL)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 7 days.

(21) Appl. No.: 15/857,249

(22) Filed: Dec. 28, 2017

Related U.S. Application Data

(60) Provisional application No. 62/448,302, filed on Jan. 19, 2017.

(51) Int. Cl.
*G06F 17/27* (2006.01)
*G06F 17/28* (2006.01)
*G06Q 30/00* (2012.01)

(52) U.S. Cl.
CPC ......... *G06F 17/289* (2013.01); *G06Q 30/016* (2013.01)

(58) Field of Classification Search
CPC .... G06F 17/289; G06F 16/243; G06F 16/285; G06F 16/9537; G06F 16/248; G06F 16/29; G06F 17/2785
USPC ................ 704/2–4, 9, 10, 8; 705/5; 717/136
See application file for complete search history.

(56) References Cited

U.S. PATENT DOCUMENTS

| | | |
|---|---|---|
| 5,068,789 A | 11/1991 | van Vliembergen |
| 5,510,981 A | 4/1996 | Berger et al. |
| 5,768,603 A | 6/1998 | Brown et al. |
| 6,956,845 B2 | 10/2005 | Baker et al. |
| 8,015,223 B1 | 9/2011 | DeRodes et al. |
| 8,671,088 B2 | 3/2014 | Cox et al. |
| 9,229,800 B2 | 1/2016 | Jain et al. |
| 9,444,773 B2 | 9/2016 | Barber et al. |
| 9,535,906 B2 * | 1/2017 | Lee ........................ G06F 1/1626 |
| 2005/0267738 A1 * | 12/2005 | Wilkinson ............ G06F 17/275 704/9 |
| 2007/0027893 A1 | 2/2007 | Gundy et al. |
| 2007/0245321 A1 * | 10/2007 | Cosgrove ................ G06F 9/454 717/136 |
| 2009/0106018 A1 * | 4/2009 | Liu ..................... G06F 17/2735 704/4 |

(Continued)

FOREIGN PATENT DOCUMENTS

| | | |
|---|---|---|
| EP | 0357344 A2 | 3/1990 |
| EP | 0399533 A2 | 11/1990 |

*Primary Examiner* — Md S Elahee
(74) *Attorney, Agent, or Firm* — Zilka-Kotab, PC

(57) ABSTRACT

A system, method, and computer program product are provided for translating unified ticketing system (UTS) messages. In operation, a translation system receives one or more messages in at least one first language being communicated between a customer ticketing system and a unified ticketing system associated with a communication service provider. The translation system translates the one or more messages, including any corresponding attachments and screenshots, from the first language to at least one second language. Further, the translation system releases the translated one or more messages, including the corresponding translated attachments and screenshots, to be communicated between the customer ticketing system and the unified ticketing system.

8 Claims, 5 Drawing Sheets

(56) References Cited

U.S. PATENT DOCUMENTS

| | | | |
|---|---|---|---|
| 2009/0157903 A1 | 6/2009 | Lewis et al. | |
| 2010/0049497 A1* | 2/2010 | Manuel-Devadoss | ................... G06F 17/289 704/3 |
| 2013/0238372 A1* | 9/2013 | Jordan | ................... G06Q 10/02 705/5 |
| 2015/0100301 A1* | 4/2015 | Phadke | ............... G06F 17/2836 704/4 |
| 2016/0373384 A1* | 12/2016 | Lun | ......................... H04L 51/04 |

\* cited by examiner

US 10,592,614 B1

SYSTEM, METHOD, AND COMPUTER PROGRAM FOR TRANSLATING UNIFIED TICKETING SYSTEM (UTS) MESSAGES

CLAIM OF PRIORITY AND RELATED APPLICATIONS

This application claims the benefit of U.S. Provisional Application No. 62/448,302, filed Jan. 19, 2017, the entire contents of which are incorporated herein by reference.

FIELD OF THE INVENTION

The present invention relates to translating unified ticketing system messages, and more particularly to translating messages being communicated between a customer ticketing system and a unified ticketing system.

BACKGROUND

Often times, information (e.g. messages, attachments, etc.) being communicated between a customer ticketing system and a unified ticketing system are required to be in different languages to accommodate end users of such systems. For example, users of the customer ticketing system may speak/read a first language and users of the unified ticketing system may speak/read a second language. Integration between these two ticketing systems can be over the internet or over the email. To date, there is not a mechanism for efficiently translating such information.

There is thus a need for addressing these and/or other issues associated with the prior art.

SUMMARY

A system, method, and computer program product are provided for translating unified ticketing system (UTS) messages. In operation, a translation system receives one or more messages in at least one first language being communicated between a customer ticketing system and a unified ticketing system associated with a communication service provider. The translation system translates the one or more messages, including any corresponding attachments and screenshots, from the first language to at least one second language. Further, the translation system releases the translated one or more messages, including the corresponding translated attachments and screenshots, to be communicated between the customer ticketing system and the unified ticketing system.

DETAILED DESCRIPTION

Figure 1:
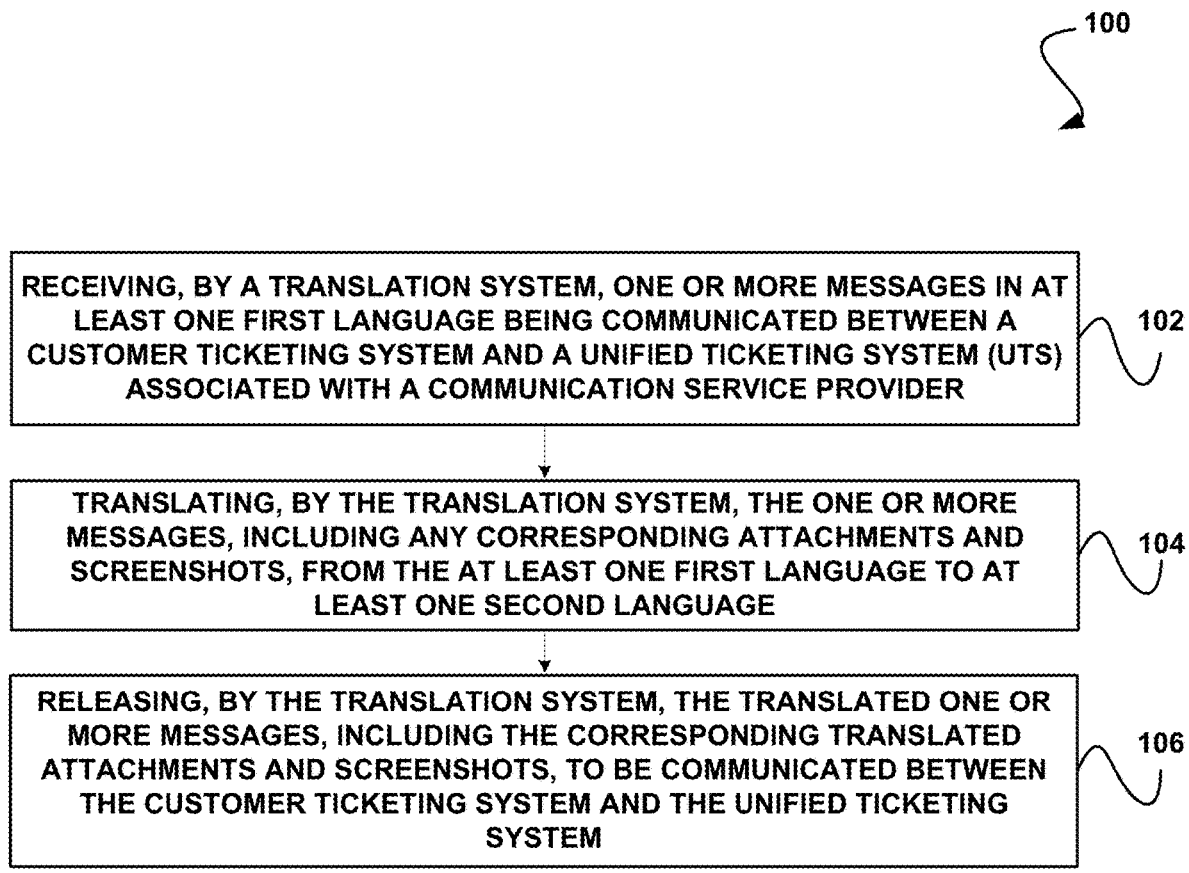
FIG. 1 illustrates a method for translating unified ticketing system (UTS) messages, in accordance with one embodiment.

FIG. 1 illustrates a method 100 for translating unified ticketing system (UTS) messages, in accordance with one embodiment.

In operation, a translation system receives one or more messages in at least one first language being communicated between a customer ticketing system and a unified ticketing system associated with a communication service provider. See operation 102.

The messages may be received by the customer ticketing system or the unified ticketing system. In other words, the messages may be sent by the customer ticketing system to the unified ticketing system, or the messages may be sent by the unified ticketing system to the customer ticketing system.

The translation system translates the messages, including any corresponding attachments and screenshots, from the first language to at least one second language. See operation 104. The translation system may translate any attachment, including notes and documents, etc. The first and second language may include any written/audible language. As an example, the first language may be translated to English, etc.

Further, the translation system releases the translated messages, including the corresponding translated attachments and screenshots, to be communicated between the customer ticketing system and the unified ticketing system. See operation 106. In other words, the translation system may send the translated messages to the initially intended target.

The translating to the second language may function to allow a system to search a knowledge database for a solution associated with the one or more messages, utilizing the second language, and/or to match an incident associated with the one or more messages from a ticket history, utilizing the second language. Of course, the translation may be utilized to generally understand the messages, etc.

It should be noted that the method 100 may be implemented utilizing various systems, hardware, software, applications, user interfaces, etc., as dictated by the implementer. For example, the translation system may include one or more processors, databases, etc., as well as implement various logic, computer code, applications, and/or user interfaces, etc.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
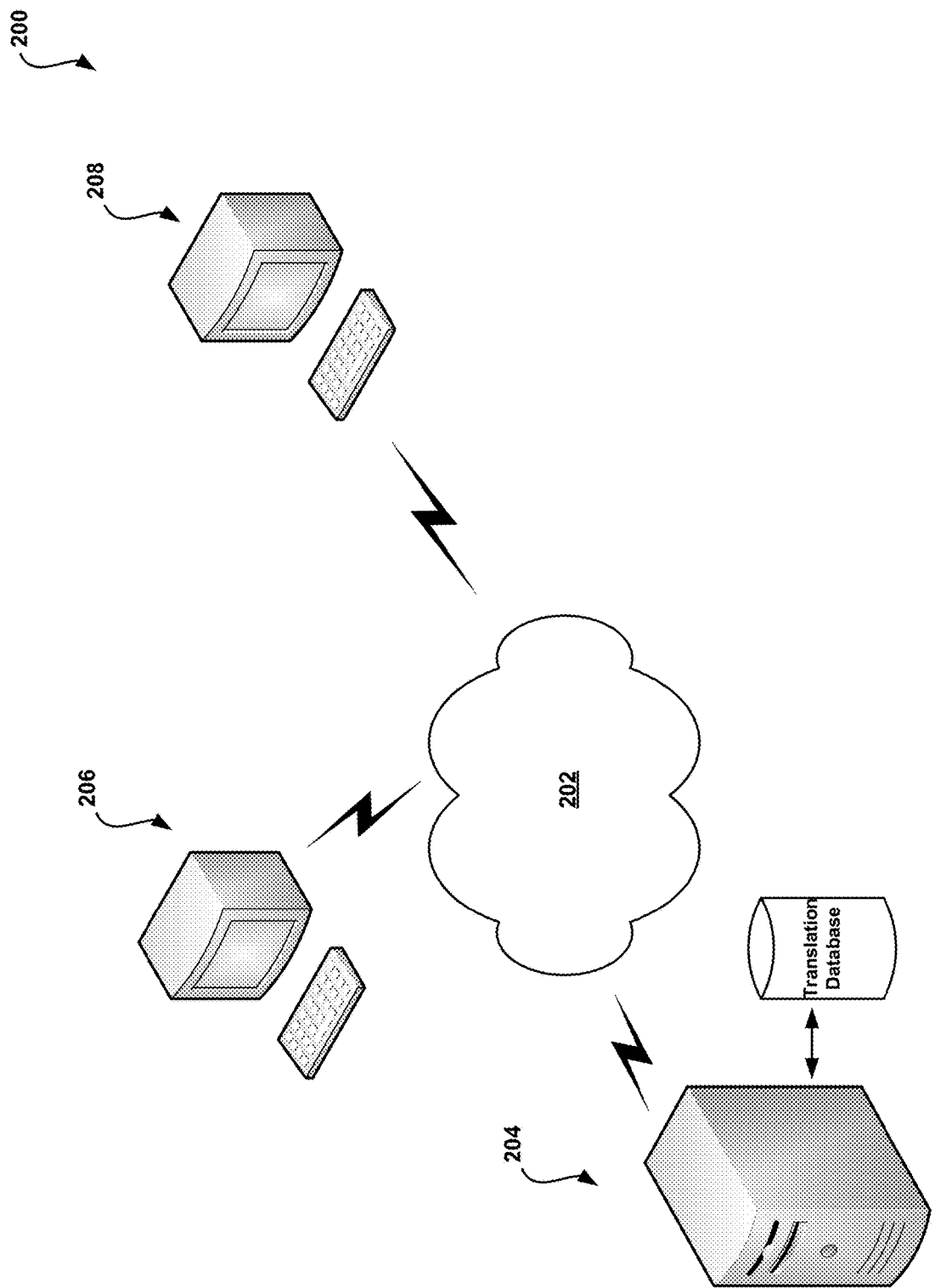
FIG. 2 shows a system for translating unified ticketing system messages, in accordance with one embodiment.

FIG. 2 shows a system 200 for translating unified ticketing system messages, in accordance with one embodiment. As an option, the system 200 may be implemented in the context of the details of the previous figure and/or any subsequent figure(s). Of course, however, the system 200 may be implemented in the context of any desired environment. Further, the aforementioned definitions may equally apply to the description below.

As shown, the system 200 includes a translation system 204, which may implement a variety of applications or software, etc. The translation system 204 may be capable of communicating with a customer ticketing system 206 and a unified ticketing system 208, either directly or over one or more networks 202, for translating messages and information being communicated between such systems.

The translation system 204 can translate all incoming and outgoing messages and attachments between the customer ticketing system 206 and the unified ticketing system 208 from a first language (e.g. a local language, etc.) to a second language (and vice versa).

For example, the translation system 204 may translate all incoming and outgoing messages between the customer ticketing system 206 and the unified ticketing system 208 from a local language to English. The translation system 204 may also translate all incoming and outgoing attachments between the customer ticketing system 206 and the unified ticketing system 208 from a local language to English.

Additionally, the translation system 204 may search content from a knowledge database after a ticket is translated from a local language to English (e.g. Local Language==>Translate to English==>Search Knowledge Repository==>Return results in English). Further, the translation system 204 may match an incident from a ticket history after the ticket is translated from the local language to English (e.g. Local Language==>Translate to English==>Search incident history==>Return results in English). In one embodiment, the translation system 204 may be implemented as an added layer on top of an integration layer through which the translation system 204 may directly communicate with the customer ticketing system 206.

Figure 3:
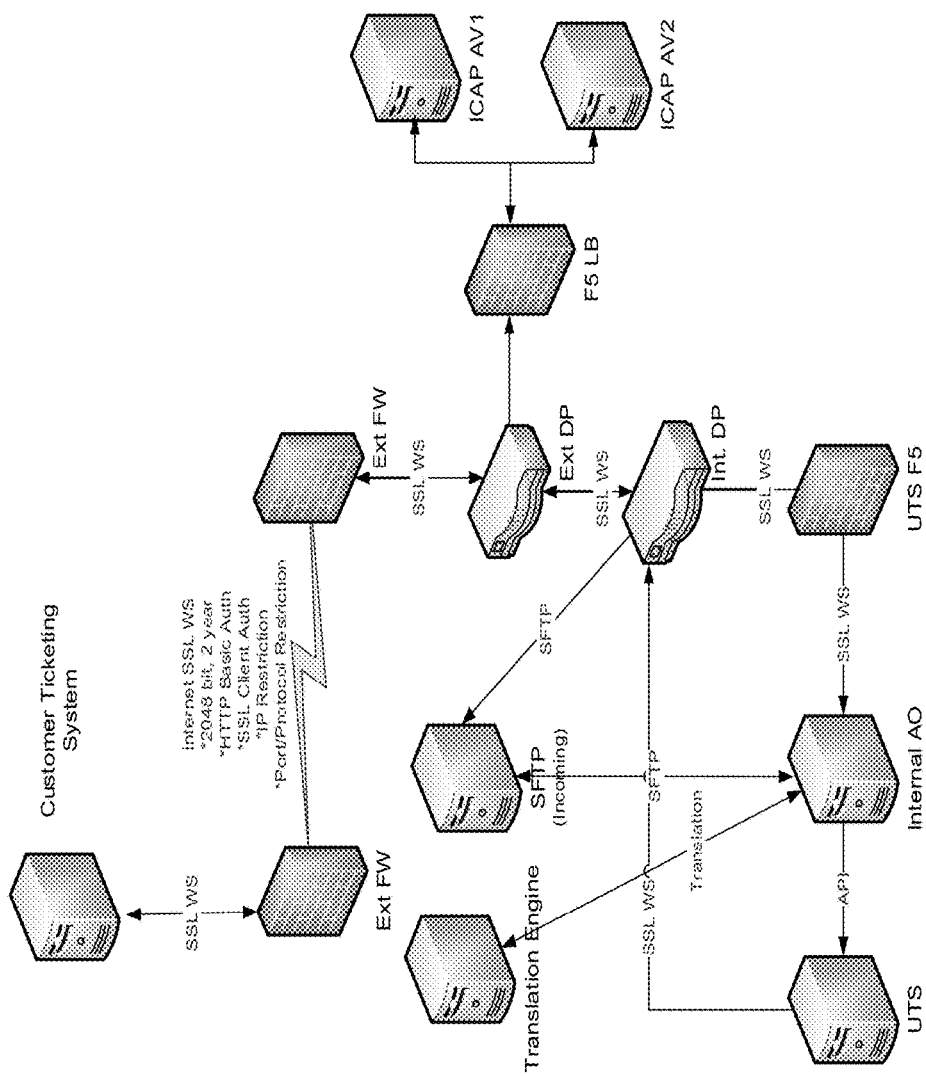
FIG. 3 shows a system diagram for translating unified ticketing system messages, in accordance with another embodiment.

FIG. 3 shows a system diagram 300 for translating unified ticketing system messages, in accordance with one embodiment. As an option, the system diagram 300 may be implemented in the context of the details of the previous figures and/or any subsequent figure(s). Of course, however, the system diagram 300 may be implemented in the context of any desired environment. Further, the aforementioned definitions may equally apply to the description below.

In various embodiments, the customer ticketing system and the unified ticketing system may be integrated using web services or email over the Internet using two way SSL authentication. In one embodiment, any text/attachment may be passed through firewalls to an external data power server. Text/attachments may also be scanned for viruses through antivirus servers. After an antivirus scan, the text and attachments may be separated. Both text and attachments may then pass through a machine translation system/engine, which may be part of the translation system.

Any attachment may go to an SFTP (Secure File Transfer Protocol) server. Any text may go to an Orchestrator. The SFTP server may drop the attachment in the Orchestrator, which then may pass both the text and attachments to a UTS Mid-Tier. While on the way out, both text and attachments may pass through the machine translation engine and then move to the customer network via the data power server. In various embodiments, the translation system may include the SFTP server, the Orchestrator, and/or the data power server.

The translation system may translate any content from a local language to another language (e.g. English) on inbound/incoming, including summaries, notes, screen shots, and attachments, etc. The translation system may search content from the KM database (Local Language→Translate to English→Search KM) and also send integration error messages in a local language. The translation system may translate any content from a local language to another language (e.g. English) on outbound, such as work information, resolution summaries, screen shots, and/or attachments, etc. The translation system may also perform incident matching (Local Language→Translate to English→Search incident history→Return Results).

Figure 4:
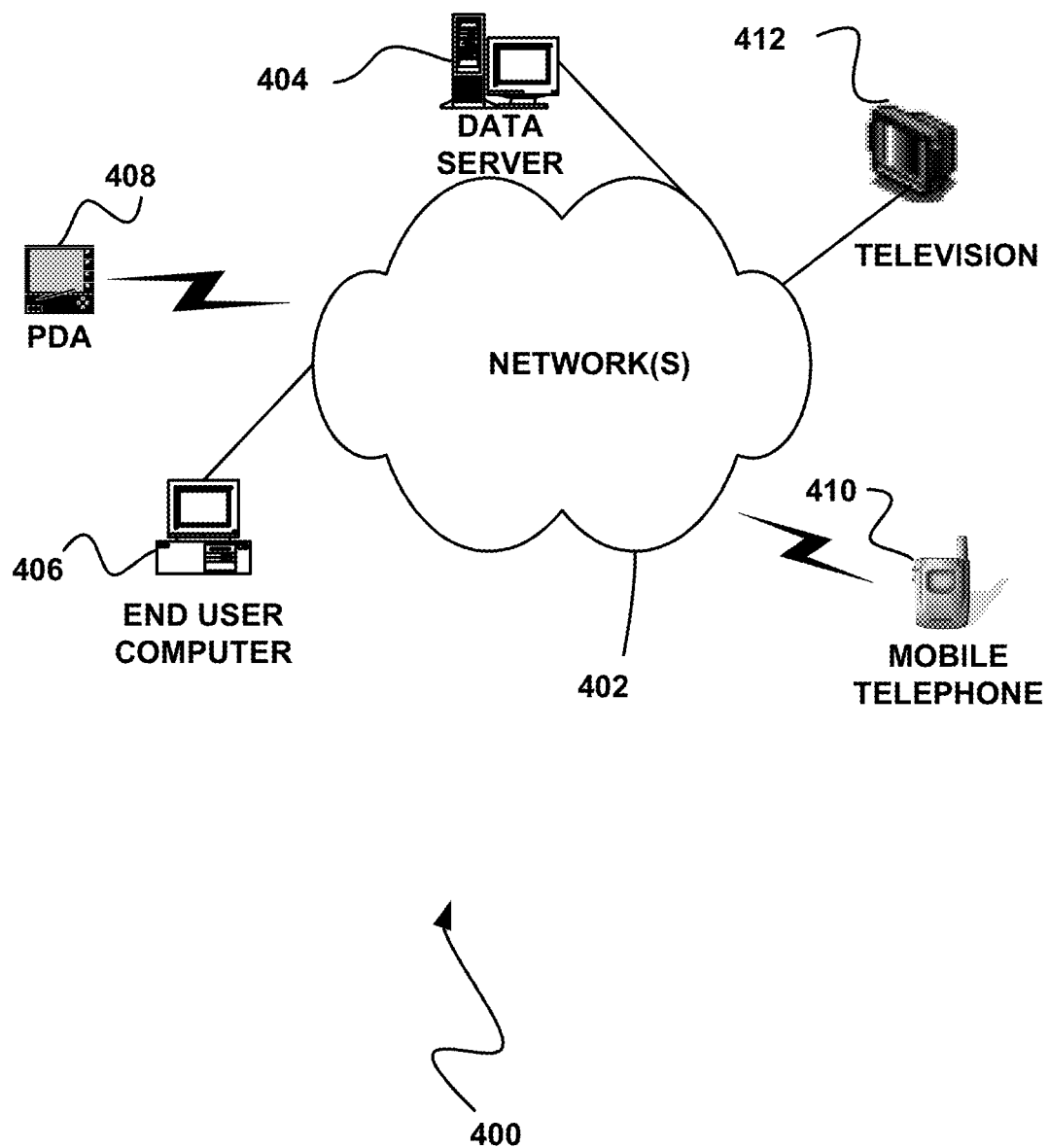
FIG. 4 illustrates a network architecture, in accordance with one possible embodiment.

FIG. 4 illustrates a network architecture 400, in accordance with one possible embodiment. As shown, at least one network 402 is provided. In the context of the present network architecture 400, the network 402 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 402 may be provided.

Coupled to the network 402 is a plurality of devices. For example, a server computer 404 and an end user computer 406 may be coupled to the network 402 for communication purposes. Such end user computer 406 may include a desktop computer, lap-top computer, and/or any other type of logic. Still yet, various other devices may be coupled to the network 402 including a personal digital assistant (PDA) device 408, a mobile phone device 410, a television 412, etc.

Figure 5:
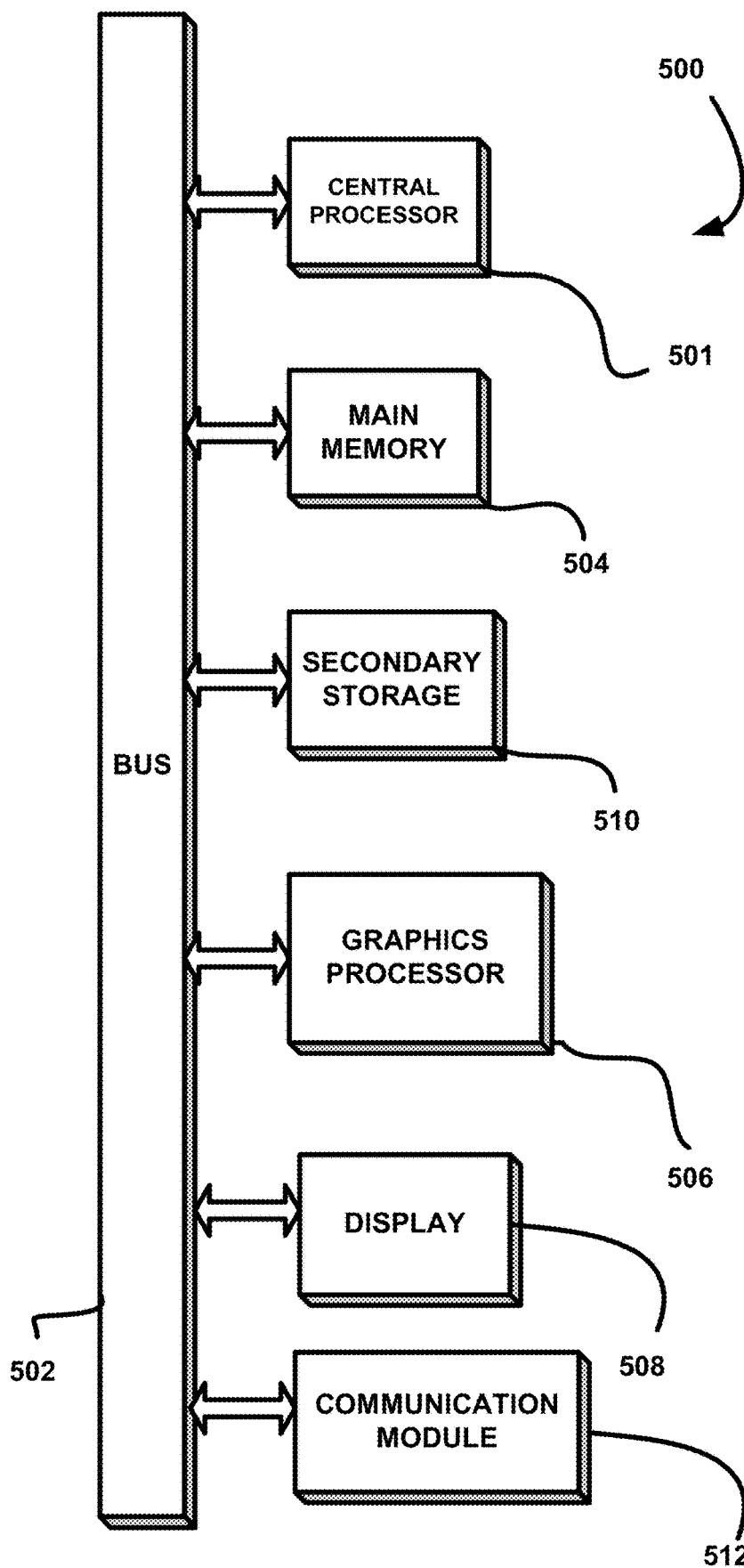
FIG. 5 illustrates an exemplary system, in accordance with one embodiment.

FIG. 5 illustrates an exemplary system 500, in accordance with one embodiment. As an option, the system 500 may be implemented in the context of any of the devices of the network architecture 400 of FIG. 4. Of course, the system 500 may be implemented in any desired environment.

As shown, a system 500 is provided including at least one central processor 501 which is connected to a communication bus 502. The system 500 also includes main memory 504 [e.g. random access memory (RAM), etc.]. The system 500 also includes a graphics processor 506 and a display 505.

The system 500 may also include a secondary storage 510. The secondary storage 510 includes, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the main memory 504, the secondary storage 510, and/or any other memory, for that matter. Such computer programs, when executed, enable the system 500 to perform various functions (as set forth above, for example). Memory 504, storage 510 and/or any other storage are possible examples of non-transitory computer-readable media.

The system 500 may also include one or more communication modules 512. The communication module 512 may be operable to facilitate communication between the system 500 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:

receiving, by a translation system, a first message in a first language being communicated from a customer ticketing system to a unified ticketing system (UTS) associated with a communication service provider, the first message including text and an attachment;

translating, by a machine translation engine of the translation system, the first message from the first language to a second language by translating the text and the attachment from the first language to the second language;

searching, by the translation system, a knowledge database for a solution associated with the first message, using the translated first message;

determining, by the translation system from a result of the searching, the solution associated with the first message, the result being in the second language;

sending, by the translation system, the translated first message including the text and the attachment in the second language to the unified ticketing system;

receiving, by the translation system, a second message in a second language being communicated from the UTS to the customer ticketing system;

translating, by the machine translation engine of the translation system, the second message from the second language to the first language; and sending, by the translation system, the translated second message to the customer ticketing system.

2. The method of claim 1, wherein the second language includes English.

3. The method of claim 1, further comprising:
passing the first message through a firewall prior to the translating;
scanning the first message for viruses prior to the translating;
separating the text and the attachment prior to the translating;
passing the separated text and attachment through the machine translation engine for translation thereof.

4. The method of claim 1, wherein the first message further includes a screen shot, and wherein the translating the message further includes translating the screen shot.

5. A computer program product embodied on a non-transitory computer readable medium, comprising computer code for:
receiving, by a translation system, a first message in a first language being communicated from a customer ticketing system to a unified ticketing system (UTS) associated with a communication service provider, the first message including text and an attachment;
translating, by a machine translation engine of the translation system, the first message from the first language to a second language by translating the text and the attachment from the first language to the second language;
searching, by the translation system, a knowledge database for a solution associated with the first message, using the translated first message;
determining, by the translation system from a result of the searching, the solution associated with the first message, the result being in the second language;
sending, by the translation system, the translated first message including the text and the attachment in the second language to the unified ticketing system;
receiving, by the translation system, a second message in a second language being communicated from the UTS to the customer ticketing system;
translating, by the machine translation engine of the translation system, the second message from the second language to the first language; and
sending, by the translation system, the translated second message to the customer ticketing system.

6. The computer program product of claim 5, wherein the second language includes English.

7. A translation system, comprising one or more processors, operable for:
receiving, by the translation system, a first message in a first language being communicated from a customer ticketing system to a unified ticketing system (UTS) associated with a communication service provider, the first message including text and an attachment;
translating, by a machine translation engine of the translation system, the first message from the first language to a second language by translating the text and the attachment from the first language to the second language;
searching, by the translation system, a knowledge database for a solution associated with the first message, using the translated first message;
determining, by the translation system from a result of the searching, the solution associated with the first message, the result being in the second language;
sending, by the translation system, the translated first message including the text and the attachment in the second language to the unified ticketing system;
receiving, by the translation system, a second message in a second language being communicated from the UTS to the customer ticketing system;
translating, by the machine translation engine of the translation system, the second message from the second language to the first language; and
sending, by the translation system, the translated second message to the customer ticketing system.

8. The translation system of claim 7, wherein the second language includes English.

* * * * *

UNITED STATES PATENT AND TRADEMARK OFFICE
CERTIFICATE OF CORRECTION

| | |
|---|---|
| PATENT NO. | : 10,592,614 B1 |
| APPLICATION NO. | : 15/857249 |
| DATED | : March 17, 2020 |
| INVENTOR(S) | : Tzahi Menachem Shaiovitch et al. |

It is certified that error appears in the above-identified patent and that said Letters Patent is hereby corrected as shown below:

On the Title Page

Item (12), "Shaiovitch" should read --Shaiovitch et al.--.

Item (72), "Inventor":
Add --Sushil Prabhakar Kadu, Pune (IN)--.

Signed and Sealed this
Thirty-first Day of May, 2022

Katherine Kelly Vidal
*Director of the United States Patent and Trademark Office*